(12) United States Patent
Taganov et al.

(10) Patent No.: US 10,407,354 B2
(45) Date of Patent: *Sep. 10, 2019

(54) SOLUBLE FERTILIZER FORMULATION AND METHOD FOR USE THEREOF

(71) Applicant: PRO FARM TECHNOLOGIES OY, Vantaa (FI)

(72) Inventors: Igor Taganov, Saint Petersburg (RU); Anita Paldanius, Helsinki (FI); Matti Tiainen, Helsinki (FI)

(73) Assignee: PRO FARM TECHNOLOGIES OY, Vantaa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,959

(22) Filed: Aug. 21, 2018

(65) Prior Publication Data

US 2018/0354868 A1 Dec. 13, 2018

Related U.S. Application Data

(63) Continuation of application No. 15/681,792, filed on Aug. 21, 2017, now Pat. No. 10,077,216, which is a continuation-in-part of application No. 15/438,909, filed on Feb. 22, 2017, now Pat. No. 9,738,567.

(51) Int. Cl.
| | |
|---|---|
| *C05D 9/02* | (2006.01) |
| *C05F 11/02* | (2006.01) |
| *C05F 11/08* | (2006.01) |
| *C05F 11/10* | (2006.01) |
| *C05G 3/00* | (2006.01) |

(52) U.S. Cl.
CPC ............... *C05F 11/02* (2013.01); *C05D 9/02* (2013.01); *C05F 11/08* (2013.01); *C05F 11/10* (2013.01); *C05G 3/0064* (2013.01)

(58) Field of Classification Search
None
See application file for complete search history.

(56) References Cited

U.S. PATENT DOCUMENTS 10,077,216 B2 * 9/2018 Taganov ................. C05F 11/02

* cited by examiner

*Primary Examiner* — Alton N Pryor
(74) *Attorney, Agent, or Firm* — Polsinelli PC

(57) ABSTRACT

A method for producing a co-polymer of fulvic acid and poly-metallic humates (CPFAPH) including performing a decomposition reaction via electrolysis of an initial water substratum to produce an end product comprising hydrolyzates; and performing a polymerization of the hydrozylates.

8 Claims, No Drawings

SOLUBLE FERTILIZER FORMULATION AND METHOD FOR USE THEREOF

CROSS-REFERENCE TO RELATED APPLICATION

This application is a continuation of U.S. application Ser. No. 15/681,792, filed Aug. 21, 2017, which is a continuation-in-part application of U.S. application Ser. No. 15/438,909 (now U.S. Pat. No. 9,738,567), filed Feb. 22, 2017, the entire contents of which are incorporated herein by reference.

FIELD OF THE INVENTION

The following description relates generally to fertilizers, more specifically, the disclosure herein relates to soluble fertilizers for use in stimulating health and growth of plants.

BACKGROUND

Fertilizers can be added to the soil or foliage of crops to supply the elements necessary for proper plant nutrition. Typically, elements such as nitrogen (N), phosphorus (P), and potassium (K) are used to make up the basic components of standard fertilizers. However, modern, complex fertilizers can contain a variety of micronutrients and a growth enhancing mixture (also referred to herein as "GEM") having growth promoters, vitamins, amino acids, carbohydrates and polysaccharides in addition to the basic components.

Modern agricultural technologies can also use pesticides can include the release of Due to the negative effect both fertilizers and pesticides can have on the environment, there are on-going efforts by those in the field to reduce the amount of substances necessary to treat plants to increase growth Thus, there is a need in the field for new agricultural chemicals, and methods for application thereof, that decreases the amount of basic fertilizers and pesticides used, while improving the growth and stress tolerance of plants.

SUMMARY

The present inventive concept provides a humate based fertilizer (also referred to herein as a "Universal Bio Protector", or "UBP") which is readily water-soluble and adapted for seed treatment and foliar application. The fertilizer of the present inventive concept generally includes a fertilizer containing humic compound (such as the co-polymer of fulvic acid and poly-metallic humates (referred to herein as "CPFAPH")), chelated micronutrients, and biologically active metallic catalysts.

The aforementioned may be achieved in an aspect of the present inventive concept by providing a fertilizer having a growth enhancing component present in the amount of from about 80% to about 90% by weight, a plurality of elements present in the amount of from about 3% to about 7% by weight, and one or more secondary nutrients, micronutrients, and biologically active heteromolecular trace-metal complexes present in the amount of from about 3% to about 10% by weight, based on the total weight of the fertilizer. The growth enhancing component may include a co-polymer of fulvic acid and poly-metallic humates (CPFAPH). The plurality of elements may include, but are not limited to, nitrogen compounds, phosphorus compounds, and sulfur compounds. The growth enhancing component may include promoters selected from the group consisting of cytokinins, purines, gibberellins, and auxins. The growth enhancing component may include vitamins and at least one component selected from the group consisting of growth promoters, amino acids, carbohydrates, and polysaccharides. The growth enhancing component may include dry probiotics.

The aforementioned may be achieved in another aspect of the present inventive concept by providing a method of promoting crop production. The method may include mixing a fertilizer and applying the fertilizer to a crop. The method may include dissolving the fertilizer in an aqueous solution, soaking a plurality of seeds in the solution for a predetermined duration, placing the fertilizer into a spray tank, and spraying the crops with the liquid fertilizer solution. The fertilizer may be dissolved in water to obtain a liquid fertilizer mixture. The crops may be sprayed at predetermined time intervals. The crops may be sprayed two to four times with the liquid fertilizer solution. The fertilizer may include twenty to fifty percent by weight water soluble fertilizing nitrogen and phosphorus compounds. The fertilizer may be dried in a vacuum spray dryer at a temperature of from about eighty to ninety degrees Celsius.

The aforementioned may be achieved in another aspect of the present inventive concept by providing a method for producing a crop production promoting material including producing a growth enhancing component through alkaline hydrolysis of peat. The method may include performing a liquid-phase oxidation of the peat hydrolistate and an alkaline agent solution. The alkaline agent solution may be selected from the group consisting of potassium hydroxide (KOH) and sodium hydroxide (NaOH).

The present inventive concept provides a method for producing a co-polymer of fulvic acid and poly-metallic humates (CPFAPH) including performing a decomposition reaction and a polymerization. The Decomposition reaction can be conducted via electrolysis of an initial water substratum to product an end product including hydrolyzates. The electrolysis can occur for a period of from about one hour to about three hours, at a temperature of about 50° C. to about 90° C., a pressure of about 1 atmosphere (atm), and at an electrode current density of from about 10 ampere to about 50 ampere per square meter. The electrolysis process can further include stirring the initial water substratum and treating the initial water substratum with an oxygen containing gas. The initial water substratum can include at least one or more of a peat pulp, a lignosulphonate, a fulvic acid, a humic acid, and a growth enhancing component. The polymerization of the hydrolyzates can include the process of introducing salts of catalytically active metals, such as alkali metals, alkaline earth metals, and transition metals.

DETAILED DESCRIPTION

This present disclosure relates to a fertilizer (also referred to herein as a "universal bio protector", or "UBP") that can improve the effectiveness of various nutrient inputs, or "nutrient uptake, and enhance a plant's ability to convert the nutrient into a growth response. The disclosure further provides a method for dissolving the disclosed fertilizer in water to form a solution that can be used during pre-sowing treatment of seeds, as well as a method for spraying the solution on the desired crops throughout the growing process.

The phraseology and terminology employed herein are for the purpose of description and should not be regarded as limiting. For example, the use of a singular term, such as, "a" is not intended as limiting of the number of items. Further, it should be understood that any one of the features of the present inventive concept may be used separately or in combination with other features. Other systems, methods, features, and advantages of the present inventive concept will be, or become, apparent to one having skill in the art upon examination of the figures and the detailed description. It is intended that all such additional systems, methods, features, and advantages be included within this description, be within the scope of the present inventive concept, and be protected by the accompanying claims.

Several definitions that apply throughout this disclosure will now be presented. The term "substantially" is defined to be essentially conforming to the particular dimension, shape or other word that substantially modifies, such that the component need not be exact. The terms "comprising," "including" and "having" are used interchangeably in this disclosure. The terms "comprising," "including" and "having" mean to include, but not necessarily be limited to the things so described.

Further, any term of degree such as, but not limited to, "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

As used herein, the term "co-polymer of fulvic acid and poly-metallic humates" (CPFAPH) refers to a growth enhancing component having a chemical formula of, for example, $(C_{14}H_{12}O_8)_m [C_9H_8(M_1, M_2, M_3, \ldots)O_4]_n$ and a schematic structure formula of FA-($M_1, M_2, M_3, \ldots$)-HA, for example, FA-(K; Na; ...)-HA, FA-(K; Cu; Zn; ...)-HA, etc., where FA is fulvic acid, HA is humic acid and $M_1, M_2, M_3 \ldots$ are metals.

As used herein, the term "hydrolyzates" refers to any product of a hydrolysis reaction.

Finally, the term "chelate" as used herein refers to a compound containing a ligand bonded to a central metal atom at two or more points.

The present disclosure provides a fertilizer including a mixture of growth enhancing components (referred to herein as a "growth enhancing mixture"). Such components can include, but are not limited to, a co-polymer of fulvic acid and poly-metallic humates (CPFAPH) present in an amount of from about 80% to about 90% by weight, based on a total weight of the fertilizer; macro nutrients (such as, nitrogen (N), phosphorous (P), and potassium (K) compounds) present in an amount of from about 3% to about 7% by weight, based on a total weight of the fertilizer; and secondary nutrients (such as, calcium (Ca), magnesium (Mg), and sulfur (S)) and micro nutrients (such as, zinc (Zn), copper (Cu), manganese (Mn), iron (Fe), and copper (Cu)) present in an amount of from about 3% to about 10% by weight, based on the total weight of the fertilizer. The fertilizer mixture can also include biologically active catalytic trace-metals including, but not limited to, molybdenum (Mo), vanadium (V), cobalt (Co), and nickel (Ni). The biologically active catalytic trace-metals can be present in an amount of from about 1% to about 3% by weight, based on the total weight of the fertilizer.

Some fertilizers have been adjusted to include the use of humates. Humates are naturally occurring materials that are rich in humified organic matter and contain effective humic substances, such as humic acid and fulvic acids. Specifically, humic acid is a powerful promotant of beneficial fungi and can also stabilize nitrogen content in soil, allowing for improved nitrogen efficiency. Humic acid also contains complex phosphates and humates are the only known substance with the ability to hold onto all other nutrients in the soil, which allows for heightened nutrient absorption. Humates contain an auxin-like growth promotant that can enhance cell division and increase the permeability of plant cells, allowing for around twice the nutrient uptake. Research has shown that the presence of humic substances in soil increases soil water retention, provides available carbon to soil, promotes growth of living cells, chelate ions in soil and solubilize hydrocarbons into water phase.

Specifically, the growth enhancing mixture can include one or more vitamins and at least one other component. The at least one other component can include, but is not limited to, growth promoters, amino acids, carbohydrates, polysaccharides, and dry probiotics. The growth enhancing mixture is present in the fertilizer in an amount of from about 5% to about 10% by weight, based on a total weight of the fertilizer. As discussed above, the fertilizer can generally include CPFAPH, a mixture of macro nutrients, secondary nutrients, and micro nutrients, and a predetermined amount of biologically active catalytic trace-metals. The amount of each of the individual components can be adjusted as needed, or desired, based on factors including, but not limited to, the type of crop to be fertilized, the type and conditions of the soil, and any other factors determined to be relevant.

I. Composition

The main growth enhancing component of the disclosed fertilizer is co-polymer of fulvic acid and poly-metallic humates (CPFAPH), having a chemical formula of, for example, $(C_{14}H_{12}O_8)_m [C_9H_8(K;Na;Mg;)_2O_4]_n$ and a schematic structural formula of, for example, FA-(K)-HA, FA-(K;Na)-HA, FA-(K;Na;Mg)-HA, etc., where FA is fulvic acid and HA is humic acid.

In at least one example, the CPFAPH can be produced through the a liquid-phase oxidation of a mixture of an alkaline agent (including, but not limited to, potassium hydroxide (KOH) and/or sodium hydroxide (NaOH)) and a lignin-containing raw material, (including but not limited to pulp from wood, peat, straw, hay, and the like) having a total dry substance content in pulp of from about 12% to about 20% by weight, based on the total weight of the mixture. The production of CPFAPH can be a multiple stage process. For example, in a first stage pre-oxidation can be carried out at a temperature of from about 50° C. to about 190° C., and a pressure of from about 0.5 mega Pascal (MPa) to about 3 MPa, wherein the reaction mixture is simultaneously treated with an oxygen-containing gas until a pH of from about 10.5 to about 12 is achieved. In a second stage, the process can include an oxidation that can be carried out in at a temperature of from about 170° C. to about 200° C., until pH of from about 8.5 to about 10 is achieved. The production of cellulose using a sulphite process can produce a by-product comprising concentrated solutions of lignosulphonate or lignin containing pulp. The by-product can then be recycled and used as a lignin-containing raw material in a subsequent production process.

In an alternative example, a CPFAPH can be produced through a liquid-phase oxidation of a mixture of alkaline agent solution (including, but not limited to KOH and NaOH) with an alkaline hydrolisate of peat. The production process can take place in multiple steps. In a first step, peat can be processed by hydrolysis using a 0.1 molar (M) (around 0.6%) water solution of KOH and/or NaOH with the mass ratio "alkaline solution-peat" of from about 15:5 to about 7:5 for 72 hours at a temperature of from about 15° C. to about 25° C. and atmospheric pressure (1 atm). A second step can include raising the alkaline agent solution concentration to about 2.0±0.1% and the saturation of the peat pulp by hot air at a temperature of about 90° C. to about 100° C. and atmospheric pressure with the saturation of the reactor working space with air 2.5±0.2 m³/min m³. After about 2.5±0.5 hours of liquid-phase oxidation, the solution of synthesized CPFAPH can be separated from the peat pulp by centrifugation.

In at least one example, the CPFAPH mixture described herein can comprise from about 18% to about 20% by weight dry substances, from about 1% to about 5% by weight ashes, and from about 70% to about 75% by weight organics, based on the total weight of the fertilizer; and have a pH of from about 9 to about 10.

In at least one example, prior to the second step of the process described above, fulvic acid (having an average chemical formula $C_{135}H_{182}O_{95}N_5S_2$) and humic acid (having an average chemical formula $C_{187}H_{186}O_{89}N_9S_1$) can be introduced into the reaction mixture having nitrogen (N) and sulfur (S). The N and S can function as alloying elements in the finished CPFAPH.

In order to prepare the CPFAPH into the reaction mixture must be introduced specific poly-metallic catalysts which can be in the form of suitable water-soluble compounds. These catalysts can include, but are not limited to, metals that are considered secondary nutrients (such as, calcium (Ca), magnesium (Mg)), and micro nutrients (such as, zinc (Zn), copper (Cu), manganese (Mn), iron (Fe), and the like). The above described metals can remain, at least in part, in the end-solution of CPFAPH in the form of humic chelates.

Chelated nutrients can be beneficial in both seed treatment and foliar application. Plant leaves and seeds can have waxy coatings to help prevent them from drying out. However, the wax can also repel both water and inorganic substances, preventing inorganic nutrients from penetrating the seed or leaf. Metal-organic chelate molecules are able to penetrate the waxy layers. Once absorbed, the chelate can release nutrients to be used by the plant.

The end-product of CPFAPH can contain at least a certain amount of chelated micro nutrients; however chelates having humic ligands are not stable at the high temperatures typically used during the drying processes. Therefore, additional stable chelated micro nutrients can be introduced into the end-product, including the UBP mix. A chelating agent can be prepared having chelated calcium (Ca), magnesium (Mg), zinc (Zn), and copper (Cu) and can also include ethylenediaminetetraacetic acid (EDTA). In the alternative, the preparation of a chelated manganese (Mn) and iron (Fe) can be used as a chelating agent ethylenediamine-N,N'-bis (2-hydroxyphenylacetic acid) (EDDHA). The iron and manganese of the EDDHA chelates are stable in solution having a high pH, even at high temperatures. Such chelated micro nutrients can be produced by variety of well-known methods and are also commercially available from a variety of sources.

The chelated micro nutrients can then be introduced into a heated end-product of CPFAPH to form heteromolecular metal complexes having two types of ligands, humic compounds and EDTA or EDDHA ligands. Compared to conventional EDTA and EDDHA chelates, the heteromolecular chelated micro nutrients described herein can be more biologically active.

Biologically active trace-metals such as molybdenum (Mo), vanadium (V), nickel (Ni), and cobalt (Co) have been found to play an important role in plant metabolism. Ni, in low concentrations, has been found to fulfill a variety of essential roles in plants, including being a constituent of several metallo-enzymes such as urease, superoxide dismutase, NiFe hydrogenases, methyl coenzyme M reductase, carbon monoxide dehydrogenase, and the like. Therefore, Ni deficiencies in plants can reduce urease activity, disturb N assimilation, and reduce scavenging of superoxide free radical. Cobalt can significantly increase nitrogenase activity and is an essential element for the synthesis of vitamin B12. As such, cobalt can be especially important for crops, such as legumes, due to the ability of symbiotic microorganisms to fix to atmospheric nitrogen.

A trace-metal deficiency can produce an array of negative effects on the growth and metabolism of plants. These effects can include, but are not limited to, reduced growth and induction of senescence, leaf and meristem chlorosis, alterations in N metabolism, and reduced iron uptake. Providing trace-metal fertilization through foliar sprays can allow for effective elimination of internal trace-metal deficiency and raise the activity of metallo-enzymes, promoting stem elongation and leaf disc expansion, number of branches and leaves, and leaf area index.

In at least one example, the effective seed treatment and foliar application of the fertilizer can include heteromolecular trace-metal complexes. A heteromolecular metal complex can have a general formula of $[CPFAPH]_m M_x\text{-}[O]_n$, where O is a multi-valent organic molecule and M is any metal in any oxidation state; wherein the values of n, x, and m are associated with a metal coordination number and a number of complex centers in organic molecules H and O. For example, hydroxy acids (citric, oxalic, succinic, malic, etc.), phthalic acid, salicylic acid, acetic acid and derivatives, gluconic acid and derivatives can be used as multi-valent organic molecules having chelating capacity. In at least one example, production of the present fertilizer can only include the carboxylic acids that are known to participate in plant metabolism; specifically citric acid ($C_6H_8O_7$), gluconic acid ($HOCH_2$—$(CHOH)_4$—$COOH$), oxalic acid ($HOOC$—$COOH$), tartaric acid ($HOOC$—$CHOH$—$CHOH$—$COOH$), and their derivatives.

In at least one example, a method for the synthesis of heteromolecular metal complexes can consist of preparing an O-Metal complex, and subsequently adding the O-Metal complex to the CPFAPH, under predetermined pH (such as a pH of about 8±1), pressure (such as atmospheric pressure), and temperature conditions (such as about 25±5° C.). For example, the synthesis of a mixture of heteromolecular humate-molybdenum, cobalt, and nickel citrate complexes can consist of two stages: the first stage can be the preparation of Mo, Co, and Ni citrates. For each mole of citric acid, 3 moles of Mo/Co/Ni and 14 moles of ammonia are reacted in an aqueous medium. The solid product obtained from the reaction can contain about 30% by weight of Mo/Co/Ni as a mixture of ammoniated Mo/Co/Ni citrate. During the second stage, the solution of ammoniated Mo/Co/Ni citrate can be mixed in equivalent proportion with a 15% solution of CPFAPH kept under constant stirring. In at least one example, the pH of the reaction can be adjusted to about 9. The reaction can be conducted at about 25° C. and a pressure of about 1 atmosphere. In at least one example, the reaction can continue at this temperature and pressure for about 4 hours, the resulting product may contain about 3% of Mo/Co/Ni by weight, based on a total weight of the dry mass of the solution, chelated by the heteromolecular humate-citrate system.

The average content of specific chemical elements within the end-product of the fertilizer disclosed herein having a pH (6%) of from about 8 to about 10, as shown in Table 1, below. The weight percentage for each dry material presented in Table 1 are percentage by weight, based on the total weight of dry mass in solution.

TABLE 1

| Dry Material | Weight Percent |
|---|---|
| Organic Substances | 80-90 |
| Potassium (K) | 8-12 |
| Sodium (Na) | 2-4 |
| Sulfur (S) | 2-8 |
| Nitrogen (N) | 0.5-1.5 |
| Phosphorus (P) | 0.5-1.5 |
| Calcium (Ca) | 0.5-1 |
| Magnesium (Mg) | 0.5-1 |
| Iron (Fe) | 0.05-1.0 |
| Manganese (Mn) | 0.05-0.5 |
| Zinc (Zn) | 0.05-0.5 |
| Copper (Cu) | 0.05-0.5 |
| Boron (B) | 0-0.1 |
| Selenium (Se) | 0-0.1 |
| Nickel (Ni) | 0-0.1 |
| Cobalt (Co) | 0.05-0.3 |
| Molybdenum (Mo) | 0.05-0.3 |
| Vanadium (V) | 0-0.1 |

II. Formulation of the Fertilizer

In at least one example, the liquid end-product of the fertilizer described herein can contain from about 15% to about 25% of dry mass, and the end-product may be packed into containers for agricultural use. In at least one other example, the fertilizer can contain about 20% of dry mass. In at least one example, the fertilizer can include from about 20% to about 50% by weight water soluble fertilizing nitrogen and phosphorus compounds, based on the total weight of the fertilizer. The fertilizer described herein can provide a single source including of all components required to stimulate plant growth. The fertilizer formulation described herein can provide significant conveniences; specifically, use of the fertilizer disclosed herein can eliminate the need for mixing dry and liquid nutrients, as well as other additives at the time of application. The disclosure herein further provides a method of preparing a dry, water-soluble fertilizer to be used in seed treatment and foliar application.

In at least one example, the end-product of fertilizer can be dried, for example, using a vacuum spray dryer, operating at a relatively low temperature (such as, from about 80° C. to about 90° C.). In the alternative, the fertilized can be dried using a contact drum dryer. After drying, the finished fertilizer can appear in the form of dark brown granules having granulometry (ISO) 80% 1-2 mm, pH (6%) 8-10 and bulk density loose 1.2 kg/l.

In at least one example, the components of the growth enhancing mixture can be mixed separately, then added to the end-product of a previously formulated fertilizer. In the alternative, the components of the growth enhancing mixture can be added during the preparation of the fertilizer composition, as described below. The dry components, described in detail above, can be put through a grinding unit and then placed in a mixer. The liquid components, such as, the organic extracts, can be injected, or sprayed, into the mixer, and blended until a substantially homogenous dry mixture is achieved.

The fertilizer mixtures described herein can remain in dry form without clumping upon exposure to high moisture levels. The humic substances, polysaccharides, and other carbohydrates can absorb moisture associated with the liquid components to form a stable matrix. Thus, the polysaccharide and carbohydrate components can be provided in dry form when added to the mixer. In additional, the vitamins, growth promoters, and amino acids can also be provided in dry form.

III. Application of the Fertilizer

The fertilizer disclosed herein can be readily adapted for application by methods including, but not limited to, drip irrigation, hydroponics, and aeroponics. Prior to seed treatment, the dry fertilizer can be dissolved in pure water (for example, non-chlorinated water) to form the solution with a mass concentration of about 0.2% to about 1.0% by weight, based on a total weight of the fertilizer solution. In an alternative example, the mass concentration can be from about 0.2% to about 2.0% by weight, based on a total weight of the fertilizer solution. Seeds can be soaked in the fertilizer for several hours prior to planting.

In at least one example of foliar application the fertilizer can be administered in an amount ranging from about 0.05 to about 0.25 kg per hectare in the form of a water solution with mass concentration from about 0.02% to about 0.15% and most preferably about 0.05%. In another example, the fertilizer can be administered in an amount ranging from about 0.1 to about 0.5 kg per hectare. In a third example, the fertilizer can be administered in an amount ranging from about 0.045 pounds per acre to about 0.225 pounds per acre. In a fourth example, the fertilizer can be administered in an amount ranging from about 0.09 pounds per acre to about 0.45 pounds per acre. In fifth example, the fertilizer can be administered in an amount of about 0.135 pounds per acre. In a sixth example, the water solution can have a mass concentration of about 0.05%. In practice, about 2 to about 4 foliar applications can be applied during vegetation season; however, the frequency of application can be adjusted based on crops and other relevant factors.

In at least one embodiment, the fertilizer can be applied through the use of one or more spray tanks. The fertilizer can be completely water soluble, and compatible with common, commercially available, fertilizers and pesticides. The required amount of enhanced fertilizer, or UBP fertilizer, can be added directly into partly filled spray tank under constant agitation.

In an alternative example, the fertilizer can be dried as described above and placed into nutrient solution to be used in drip irrigation, hydrophonics, or aeroponics.

Application of the fertilizer can be adjusted based on crop-specific recommendations, which can affect one or more of the application method, time of application, rate of application, and fertilization formulation. Some crops which can benefit from the application of the fertilizer disclosed herein include, but are not limited to, fruits, grapes, nuts, citrus, coffee, watermelon, potatoes, tomatoes, peppers, cucumbers, row crops (such as cotton, sunflower, corn, wheat, rye, oats, millet, sorghum, rice and soybeans), as well as other edible, commercial, and ornamental plants.

In at least one example, the fertilizer described herein can be configured for rapid seed and leaf penetration, highly efficient nutrient uptake, and full utilization in plant metabolism. Additionally, use of the fertilizer disclosed herein can decrease the amount of mineral fertilizers, fungicides, herbicides and insecticides typically necessary to promote plant growth by about 25%.

Tests were performed on the disclosed fertilizer to determine yield after administration of a standard (commercially available) fertilizer and a fertilizer including the growth enhancing mixture as described throughout the application after a specified number of treatments. The tests allow estimation of the effect of the fertilizer disclosed herein.

The following examples are provided to illustrate the subject matter of the present disclosure, including the effect of the fertilizer on crop production. These examples are not intended to limit the scope of the present disclosure, and should not be so interpreted.

EXAMPLE

Example 1

Crop Tested—Wheat
Field Trial Location—Maharashtra, Republic of India,
A first field was tested using a standard fertilization program, the first field produced a yield of 2.73 tons per hectare (tons/ha) (or 1.09 tons per acre (tons/A)). The average weight of grains per spike was 1.69 grams (g).
A second field was tested using the disclosed fertilization program including UBP treatment of seeds (0.15 kilograms per ton (kg/ton) (or 0.33 pounds per ton (lb/ton))) and 2 foliar UBP treatments (each 0.15 kilograms per hectare (kg/ha) (or 0.132 pounds per acre (lb/A))), the second field produced a yield of 3.21 tons/ha (1.28 tons/A). The average weight of grains per spike was 1.78 g.
The UBP treatment program provided an increased yield of 0.48 tons/ha (0.19 tons/A), or 17.6% over the standard fertilization program.

Example 2

Crop Tested—Rice
Field Trial Location—Sichuan Province, People's Republic of China
A first field was tested using a standard fertilization program, the first field produced a yield of 6.35 tons/ha (2.54 tons/A). The average weight of 1000 rice grains was 28.5 g and vitreousness 90%.
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 7.37 tons/ha (2.95 tons/A). The average weight of 1000 rice grains was 30.2 g and vitreousness was 95%.
The UBP treatment program provided an increased yield of 1.02 tons/ha (0.41 tons/A), or 16% over the standard fertilization program.

Example 3

Crop Tested—Sorghum
Field Trial Location—Colonia Region, Eastern Republic of Uruguay
A first field was tested using a standard fertilization program, the first field produced a yield of 4.381 tons/ha (1.75 tons/A).
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 5.514 tons/ha (2.2 tons/A).
The UBP treatment program provided an increased yield of 1.133 tons/ha (0.532 tons/A), or 25.9% over the standard fertilization program.

Example 4

Crop Tested—Soybeans
Field Trial Location—Soriano Region, Eastern Republic of Uruguay
A first field was tested using a standard fertilization program, the first field produced a yield of 3.083 tons/ha (1.233 tons/A).
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 3.669 tons/ha (1.47 tons/A).
The UBP treatment program provided an increased yield of 0.586 tons/ha (0.234 tons/A), or 19% over the standard fertilization program.

Example 5

Crop Tested—Borlotto beans
Field Trial Location—Marche Region, Italian Republic
A first field was tested using a standard fertilization program, the first field produced a yield of 3.2 tons/ha (1.28 tons/A).
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 3.7 tons/ha (1.48 tons/A).
The UBP treatment program provided an increased yield of 0.5 tons/ha (0.2 tons/A), or 15.6% over the standard fertilization program.

Example 6

Crop Tested—Tomatoes
Field Trial Location—Kuban Region, Russian Federation
A first field was tested using a standard fertilization program, the first field produced a yield of 27.5 tons/ha (11 tons/A). The average content of sugar in tomatoes was 3.1% and average content of ascorbic acid was 32 milligrams (mg) per 100 g of wet mass.
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 32.5 tons/ha (13 tons/A). The average content of sugar and ascorbic acid in tomatoes was 3.6% and 40 mg per 100 g of wet mass, respectively.
The UBP treatment program provided an increased yield of 5 tons/ha (2 tons/A), or 18.2% over the standard fertilization program.

Example 7

Crop Tested—Sugar beet
Field Trial Location—Kuban Region, Russian Federation
A first field was tested using a standard fertilization program, the first field produced a yield of 33 tons/ha (13.2 tons/A). The average content of sugar in root-crop was 16.9%.
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 38.7 tons/ha (15.5 tons/A). The average content of sugar in root-crops was 18.2%.
The UBP treatment program provided an increased yield of 5.7 tons/ha (2.3 tons/A), or 17.3% over the standard fertilizing program.

Example 8

Crop Tested—Potatoes
Field Trial Location—Czech Republic
A first field was tested using a standard fertilization program, the first field produced a yield of 29.5 tons/ha (11.8 tons/A). The average content of starch in root-crop was 17.8%.
A second field was tested using the disclosed fertilization program including UBP treatment of seed-roots (0.15 kg/ton (0.33 lb/ton)) and 2 foliar UBP treatments (each 0.15 kg/ha (0.132 lb/A)), the second field produced a yield of 35.1 tons/ha (14 tons/A). The average content of starch in root-crops was 19.9%.
The UBP treatment program provided an increased yield of 5.6 tons/ha (2.24 tons/A), or 19% over the standard fertilizing program.

Example 9

Crop Tested—Cotton
Field Trial Location—Tashkent Region, Republic of Uzbekistan
A first field was tested using a standard fertilization program, the first field produced a yield of 2.86 tons/ha (1.14 tons/A).
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 3.39 tons/ha (1.36 tons/A).
The UBP treatment program provided an increased yield of 0.53 tons/ha (0.21 tons/A), or 18.5% over the standard fertilizing program.

Example 10

Crop Tested—Sorghum
Field Trial Location—Illinois, United States of America
A first field was tested using a standard fertilization program, the first field produced a yield of 6.78 tons/ha (100.7 bushels per acre (bushels/A)).
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 8.0 tons/ha (119.3 bushels/A).
The UBP treatment program provided an increased yield of 1.2 tons/ha (18.6 bushels/A), or 18.5% over the standard fertilizing program.

Example 11

Crop Tested—Soybeans
Field Trial Location—Illinois, United States of America
A first field was tested using a standard fertilization program, the first field produced a yield of 3.55 tons/ha (52.8 bushels/A).
A second field was tested using the disclosed fertilization program including UBP treatment of seeds (0.15 kg/ton (0.33 lb/ton)) and 2 foliar UBP treatments (each 0.15 kg/ha (0.132 lb/A)), the second field produced a yield of 4.17 tons/ha (62 bushels/A).
The UBP treatment program provided an increased yield of 0.62 tons/ha (9.2 bushels/A), or 17.5% over the standard fertilizing program.
As shown in the above examples, even minimal, such as two-time, foliar treatments of plants with the fertilizer including UBP led to significant increases in the crop yield and improvement of the quality of the products.

IV. Method of Manufacture

In at least one example, the fertilizer disclosed herein can be produced using the following two-stage method. First, biopolymers can be decomposed in a water substratum, and then the resulting hydrolyzates can be polymerized.

In at least one example, the initial water substratum, or pulp (such as peat pulp), can include vegetable raw materials and/or the acid or alkaline-catalyzed hydrolyzates thereof. In at least one example, the initial water substratum is a water solution of sodium and/or potassium lignosulphonates. In an alternative example, the initial water substratum is a water solution of fulvic and humic acids. In yet another alternative example, the initial water substratum is a water solution of humates including, but not limited to, sodium humate and/or potassium humate. In yet another alternative example, the initial water substratum is a water solution of fulvic acid and humates including, but not limited to, sodium humate and/or potassium humate.

The raw materials of the substratum can include a total dry substance content of from about 5% to about 40%, based on the total weight of the water substratum. The dry substance of substratum can include, but is not limited to, cellulose, hemicelluloses, starch, and pectin and/or the acid or alkaline catalyzed hydrolyzates thereof. The acid-catalyzed hydrolysis of the substratum can use strong acids including, but not limited to, hydrochloric acid (HCl) and sulfuric acid ($H_2SO_4$). The alkaline-catalyzed hydrolysis of the substratum can use, but is not limited to, potassium hydroxide (KOH), and/or sodium hydroxide (NaOH). The reaction mixture can include from about 0.5% to about 5.0% by weight acid or alkali, based on a total weight of the initial water substratum. In at least one embodiment, the pH of the substratum is increased throughout the decomposition process to become a mixture of base-catalyzed hydrolyzates.

The decomposition process can be performed at, in at least one embodiment, a temperature of from about 60° C. to about 90° C. and a pressure of about atmospheric pressure (1 atm). The process can include physical or mechanical stirring and simultaneous treatment of the substratum with an oxygen containing gas including, but not limited to, hot air. The decomposition can be allowed to continue for from about 1 hour to about 3 hours. In at least one example, the decomposition process can be performed using electrolysis. The method can include using an electrolyser having intensive pneumatic stirring and electrode current density from about 10 to about 50 ampere per square meter.

During second stage, hydrolyzates of the filtrate of the end-product of the first stage are polymerized. The polymerization process can be performed at from about 50° C. to about 90° C. and atmospheric pressure (1 atm), and can include physical or mechanical stirring for a period of about 1 hour to about 2 hours. Into the filtrate of the end-product of the first stage can be introduced salts of catalytically active metals including, but not limited to, alkaline earth metals (including, but not limited to, calcium (Ca) and magnesium (Mg), which are considered secondary nutrients for the purposes herein), and transition metals (including, but not limited to, vanadium (V), manganese (Mn), iron (Fe), cobalt (Co), nickel (Ni), copper (Cu), zinc (Zn), molybdenum (Mo), which are considered micro nutrients for the purposes herein). The presence of these homogenous catalysts, as described above, in the reaction mixture of the polymerization stage accelerates the formation of soluble high molecular weight biopolymers with metals in the polymer structure.

While the above embodiments have been described in detail in the foregoing description, the same is to be considered as illustrative and not restrictive in character, it being understood that only some embodiments have been described and that all changes and modifications that come within the spirit of the embodiments are desired to be protected.

What is claimed is:

1. A method for producing a co-polymer of fulvic acid and poly-metallic humates (CPFAPH) comprising:
    performing a decomposition reaction via electrolysis of an initial water substratum to produce an end product comprising hydrolyzates; and
    performing a polymerization of the hydrozylates to produce a co-polymer of fulvic acid and poly-metallic humates (CPFAPH).

2. The method of claim 1, wherein the electrolysis occurs for a period of from about one hour to about three hours.

3. The method of claim 1, wherein the electrolysis is performed at a temperature of about 50° C. to about 90° C. and a pressure of about 1 atmosphere (atm).

4. The method of claim 1, wherein the electrolysis is performed at an electrode current density from about 10 ampere to about 50 ampere per square meter.

5. The method of claim 1, wherein the electrolysis further comprises:
    stirring the initial water substratum; and
    treating the initial water substratum with an oxygen containing gas.

6. The method of claim 1, wherein the polymerization further comprises introducing salts of catalytically active metals into the hydrozylates.

7. The method of claim 6, wherein the catalytically active metals include alkali metals, alkaline earth metals, and transition metals.

8. The method of claim 1, wherein the initial water substratum includes at least one or more of a peat pulp, lignosulphonates, fulvic acid, humic acid, and a growth enhancing component.

* * * * *